US010392294B2

(12) United States Patent
Lautenschlaeger et al.

(10) Patent No.: US 10,392,294 B2
(45) Date of Patent: Aug. 27, 2019

(54) BOROSILICATE GLASS WITH LOW BRITTLENESS AND HIGH INTRINSIC STRENGTH, THE PRODUCTION THEREOF, AND THE USE THEREOF

(71) Applicant: SCHOTT AG, Mainz (DE)

(72) Inventors: Gerhard Lautenschlaeger, Jena (DE); Jochen Alkemper, Klein-Winternheim (DE); Ulf Dahlmann, Landshut (DE); Ulrich Fotheringham, Wiesbaden (DE)

(73) Assignee: SCHOTT AG, Mainz (DE)

( * ) Notice: Subject to any disclaimer, the term of this patent is extended or adjusted under 35 U.S.C. 154(b) by 485 days.

(21) Appl. No.: 14/757,391

(22) Filed: Dec. 23, 2015

(65) Prior Publication Data

US 2016/0176751 A1    Jun. 23, 2016

(30) Foreign Application Priority Data

Dec. 23, 2014    (DE) .................. 10 2014 119 594

(51) Int. Cl.
  *C03C 3/089*  (2006.01)
  *C03C 3/091*  (2006.01)
  *C03B 18/02*  (2006.01)
  *C03C 4/00*   (2006.01)

(52) U.S. Cl.
  CPC .............. *C03C 3/089* (2013.01); *C03B 18/02* (2013.01); *C03C 3/091* (2013.01); *C03C 4/00* (2013.01)

(58) Field of Classification Search
  CPC ................................ C03C 3/089; C03C 3/091
  See application file for complete search history.

(56) References Cited

U.S. PATENT DOCUMENTS

| | | | |
|---|---|---|---|
| 3,984,252 | A | 10/1976 | Kiefer |
| 4,870,034 | A | 9/1989 | Kiefer |
| 5,182,237 | A | 1/1993 | Brix |
| 5,459,110 | A | 10/1995 | Brix |
| 5,506,180 | A | 4/1996 | Ponthieu |
| 5,599,753 | A | 2/1997 | Watzke et al. |
| 5,627,115 | A | 5/1997 | Watzke et al. |
| 5,656,558 | A | 8/1997 | Brix et al. |
| 5,776,844 | A | 7/1998 | Koch et al. |
| 5,876,472 | A | 3/1999 | Gros et al. |
| 6,051,821 | A | 4/2000 | Dahl et al. |
| 2004/0115352 | A1 | 6/2004 | Schultheis et al. |
| 2005/0129959 | A1 | 6/2005 | Roemer-Scheuermann et al. |
| 2005/0145241 | A1 | 7/2005 | Jordens et al. |
| 2007/0003769 | A1 | 1/2007 | Striegler |
| 2007/0056961 | A1 | 3/2007 | Shimatani et al. |
| 2011/0003122 | A1 | 1/2011 | Hochrein et al. |
| 2014/0061186 | A1 | 3/2014 | Laurent et al. |

FOREIGN PATENT DOCUMENTS

| | | |
|---|---|---|
| CA | 2193999 | 10/1996 |
| DE | 588643 | 11/1933 |
| DE | 1496637 | 3/1969 |
| DE | 2413552 | 9/1975 |
| DE | 3722130 | 1/1989 |
| DE | 4012288 | 7/1991 |
| DE | 4230607 | 1/1994 |
| DE | 4325656 | 2/1995 |
| DE | 4428235 | 11/1995 |
| DE | 4430710 | 5/1996 |
| DE | 19515608 | 8/1996 |
| DE | 19643870 | 5/1998 |
| DE | 10122718 | 11/2002 |
| DE | 10150884 | 5/2003 |
| DE | 10243500 | 4/2004 |
| DE | 10355160 | 6/2005 |
| DE | 102009031972 | 1/2011 |
| EP | 0576362 | 12/1993 |
| EP | 0588000 | 8/1995 |
| EP | 1314704 | 4/2004 |
| FR | 2389582 | 12/1978 |
| GB | 1027136 | 4/1966 |
| GB | 2079119 | 2/1982 |
| JP | 2003217811 | 7/2003 |
| WO | 9633954 | 10/1996 |
| WO | 03098115 | 11/2003 |
| WO | 2004018944 | 3/2004 |
| WO | 2012146860 | 11/2012 |

OTHER PUBLICATIONS

Vocaldo,The Grüneisen parameter-computer calculations via lattice dynamics, Physics of the Earth and Planetary Interiors, 82 (1994) pp. 261-270.

Fluegel, "Thermal Expansion Calculation of Silicate Glasses at 210° C., Based on the Systematic Analysis of Global Databases," http://glassproperties.com/expansion/Expansivity_Glass_2006.pdf, pp. 1-25.

Fluegel, "Glass viscosity calculation based on a global statistical modelling approach", Glass Technol. Eur. J. Glass Sci. Technol. A, Feb. 2007, 48 (1), pp. 13-30.

Nascimento, "Diffusion processes in vitreous silica revisited", Phys. Chem. Glasses: Eur. J. Glass Sci. Technol. B, Aug. 2007, 48 (4), pp. 201-217.

Wilantewicz, "Failure Behavior of Glass and Aluminum Oxynitride (AlON) Tiles Under Spherical Indenters", Army Research Laboratory Report ARL-TR-5180, May 2010 pp. 1-68.

(Continued)

*Primary Examiner* — Elizabeth A. Bolden

(74) *Attorney, Agent, or Firm* — Ohlandt, Greeley, Ruggiero & Perle, L.L.P.

(57) ABSTRACT

An alkali borosilicate glass is provided that includes:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt %, and |
| $Li_2O$ | 0-1.0 wt %. |

The proportions of the components are chosen in such a way that the weighted crosslinking index, that is, the mean number n of constraints per atom has a value greater than 2.9.

15 Claims, No Drawings

(56) References Cited

OTHER PUBLICATIONS

Boolchand, "Intermediate phases, reversibility windows, stress-free and non-aging networks, and strong liquids," Chalcogenide Letters vol. 3, No. 2, Mar. 2006, p. 29-31.

Zhang, "The Central Role of Broken Bond-Bending Constraints in Promoting Glass Formation in the Oxides," Science, New Series, vol. 266, No. 5189 (1994), pp. 1355-1357.

Bertmer, "Short and Medium Range Order in Sodium Aluminoborate Glasses. 2. Site Connectivities and Cation Distributions Studied by Rotational Echo Double Resonance NMR Spectroscopy", J. Phys. Chem. B 104 (2000) pp. 6541-6553.

Dimitrov, "An interpretation of optical properties of oxides and oxide glasses in terms of the electronic polarizability and average single bond strength (Review)," Journal of the University of Chemical Technology and Metallurgy, 45, 3, 2010, pp. 219-250.

Table "Standard Thermodynamic Values at 25° C." of the website http://www.chemistry-reference.com/, 1979, 26 pages.

Sawvel, "Local Structure of Amorphous $(PbO)x[(B2O3)1-z(Al2O3)z]y$ $(SiO2)y$ Dielectric Materials by Multinuclear Solid State NMR", Lawrence Livermore National Laboratory, UCRL-JRNL-200058, Sep. 9, 2003, 31 pages.

Pauling, "The Nature of the Chemical Bond," Cornell University Press, New York, 1960, pp. 97-102.

ISO 834
ISO 834-1.
ISO 834-4.
DIN 4102-1b.
EN 60335-2-6-A53.

Angell "Thermodynamic aspects of the glass transition in liquids and plastic crystals", Pure & Appl. Chem., vol. 63, No. 10, 1991, pp. 1387-1392.

Wu, "Temperature and modifier cation field strength effects on aluminoborosilicate glass network structure", Journal of Non-Crystalline Solids, vol. 362, 2013, pp. 73-81.

Brunning, "On the glass transition in vitreous silica by differential thermal analysis measurements", Journal of Non-Crystalline Solids, vol. 330, 2003, pp. 13-22.

Sun, "Fundamental Condition of Glass Formation", Journal of the American Ceramic Society, vol. 30, No. 9, pp. 277-281.

Smedskjaer, "Topological Principles of Borosilicate Glass Chemistry", The Journal of Physical Chemistry, 2011, vol. 115, pp. 12930-12946.

Lide, "CRC Handbook of Chemistry and Physics", 84th Edition, 2003-2004, 32 pages.

Takaishi, "Structural Study of PbO—B2O3 Glasses by X-ray Diffraction and 11B MAS NMR Techniques", J. Am. Ceram. Soc., 83, 2000, 2543-48.

Dejong, "Polymerization of silicate and aluminate tetrahedra in glasses, melts, and aqueous solutions-IV. Aluminum coordination in glasses and aqueous solutions and comments on the aluminum avoidance principle", Geochimica et Cosmochimica Acta vol. 47, 1983, 1223-1236.

Nascimentoa, "Viscosity of strong and fragile glass-forming liquids investigated by means of principal component analysis", Journal of Physics and Chemistry of Solids 68 (2007) 104-110.

Yun, "Nuclear magnetic resonance studies of the glasses in the system Na2O—B2O3—SiO2," J. Non-Cryst. Solids 1978, 27, 363-380.

Yamashita, "Nuclear magnetic resonance studies of 0.139MO (or M'2O) • 0.673SiO2 • (0.188-x)Al2O3 • xB2O3 (M=Mg, Ca, Sr and Ba, M'=Na and K) glasses", Journal of Non-Crystalline Solids, vol. 331, 2003, pp. 128-136.

Orowan, "The Mechanical Strength Properties and the Real Structure of the Crystals", Journal of Crystallography, Mineralogy and Petrology/Department A, (1934), 10 pages.

Dean, Lange's Handbook of Chemistry, 11th ed., McGraw-Hill, New York, New York, 1979, pp. 9:5-9:64.

Morrissey, "Low Velocity Sphere Impact of Soda Lime Silicate Glass", Advances in Ceramic Armor VIII, Hoboken, NJ, USA, pp. 79-91.

BOROSILICATE GLASS WITH LOW BRITTLENESS AND HIGH INTRINSIC STRENGTH, THE PRODUCTION THEREOF, AND THE USE THEREOF

CROSS REFERENCE TO RELATED APPLICATIONS

This application claims benefit under 35 U.S.C. § 119(a) of German Patent Application No. 102014119594.9 filed Dec. 23, 2014, the entire contents of which are incorporated herein by reference.

BACKGROUND OF THE INVENTION

1. Field of the Invention

The invention relates to a strong alkali borosilicate glass as well as to a method for the production thereof and the use thereof.

2. Description of Related Art

Alkali borosilicate glasses are known as such and, for example, are commercially available under the trade names Duran, Borofloat 33, or also Pyrex. Duran, for example, contains 80.2 wt % $SiO_2$, 13.4 wt % $B_2O_3$, 2.3 wt % $Al_2O_3$, 3.5 wt % $Na_2O$ and 0.6 wt % $K_2O$.

Alkali borosilicate glasses are characterized by a low sensitivity toward change in temperature as well as by a form stability up to high temperatures. Moreover, glasses of this type show an outstanding chemical resistance on contact with liquids. For this reason, these glasses are employed for a large number of applications as household and commercial glass. These kinds of glass find use in particular in laboratories, but also in the construction of industrial equipment. Thus, for example, glass pipelines of any length are used for wastewater gases or for the transport of aggressive chemicals. Another use is found in the pharmaceutical sector.

Alkali borosilicate glasses also find use in electrical engineering for electrical insulation.

Glass is also becoming increasingly widely used in building construction—for example, in the design of facades, for balustrade elements, for roofs, for doors, and also for partition walls. This entails an increased danger in the event that a fire breaks out. Conventional flat glasses burst even when exposed to heat on one side for a short time, as a result of which shards of large area fall out and enable the fire to spread into adjacent rooms. In order to prevent this, it was already attempted earlier to prevent the shattering of glass panes by insertion of a wire mesh, so that, even when a glass pane cracks, the shards thereof are held in place in the structure by the wire mesh.

Fire-resistant glasses that fulfill the provisions of fire resistance classes G and F (DIN 4102 Part 13 (ISO 834)) have also already been developed. This requires that the glazing, including the frames and mounts, prevent penetration of flames and combustion gas according to a standard temperature-time curve (UTTC) for at least 30 or 60, 90, or 120 minutes in order to be assigned to the classes G30, G60, G90, and G 120. Analogous provisions apply to the classes F30, F60, F90, and F120. Moreover, in the case of fire resistance class F, the glass may heat up by no more than 140° C. on average above the initial temperature on the side facing away from the fire.

Fire-resistant glazing made of prestressed alkali borosilicate glasses is also known and is commercially available for the fire resistance classes G and F. These glazings have a low coefficient of linear longitudinal thermal expansion of 3.3× $10^{-6}$ $K^{-1}$, for example. This low coefficient of linear longitudinal thermal expansion reduces the thermal stresses arising in the glass in the case of fire, so that such glasses make possible higher fire resistance times with, at the same time, a smaller edge distance or depth margin. However, these glasses exhibit the drawback that, on account of the low coefficient of linear longitudinal thermal expansion, only a very small prestress can be introduced into the glass on conventional air tempering apparatus, so that these glasses generally do not fulfill the desired requirements placed on safety glasses, such as, for example, the aforementioned DIN 1249.

For this reason, alkali borosilicate glasses that have a coefficient of thermal expansion of greater than $3.5 \cdot 10^{-6}$ $K^{-1}$ have already been developed. Glasses of this type are described in DE A 42 30 607, for example. A drawback is the required content of $ZrO_2$ in these glasses. It has been found that, owing to non-fused residues of $ZrO_2$, for example, these glasses exhibit a tendency toward spontaneous fractures during thermal prestressing or tempering.

Alkali borosilicate glasses for fire-resistant glazing, which fulfill the requirements placed on temperable fire-resistant safety glass, are also described in DE A 43 25 656. These glasses are also not free of drawbacks. It has been found in the case of these glasses that, during forming processes using the float process, for example, the $Zn^{2+}$ present in the glass melt is reduced in the surface of the glass sheet to $Zn^0$ owing to the strong reducing conditions (oxygen partial pressure $p(O_2)$ in the float bath of less than $10^{-10}$ bar). However, $Zn^0$ can be readily volatilized, so that it sublimes out of the glass and condenses in the float bath on components, such as, for example, the assist rollers, which then have to be cleaned repeatedly during the process in a tedious operation. Moreover, non-sublimated, but nonetheless reduced Zn forms a coating on the surface of the flat glass, which greatly impairs the quality of the glass.

Moreover, this type of glass necessarily contains $ZrO_2$, which, as stated above, exhibits the drawback in fire-resistant safety glasses that even small amounts of non-fused $ZrO_2/ZrSiO_4$ or secondarily crystallized $ZrO_2/ZrSiO_4$ lead to spontaneous fractures during tempering. Moreover, $ZrO_2$ worsens the melting behavior, resulting in substantially higher energy costs.

DE A 195 15 608 describes an alkali borosilicate glass with a coefficient of linear longitudinal thermal expansion of $3.9-4.5 \cdot 10^{-6}$ $K^{-1}$. This glass is suited especially for fully electrical melting under cold top conditions. However, $ZrO_2$ is also necessarily required as a component for this glass, so that the glass is not optimally suited as a fire-resistant safety glass for the reasons already mentioned.

Highly temperable glasses with an expansion in the range of $3.39 \cdot 10^{-6}$ $K^{-1}$ to $5.32 \cdot 10^{-6}$ $K^{-1}$ are also described in DE A 27 56 555. These glasses exhibit the drawback of an intentionally chosen, high coefficient of thermal expansion above the transformation temperature. This leads to problems in the dimensional stability in the event of thermal stress during, for example, a coating process at temperatures below but near the transformation temperature.

Glasses with a high chemical resistance are described in DE A 44 30 710. However, these glasses are difficult to melt and exhibit a high density.

Described in EP A 0 576 362 is a thermally stable and chemically resistant alkali borosilicate glass for fire-resistant glazing. However, this glass exhibits the drawback that, because of the high transformation temperature of >600° C., it cannot be tempered on conventional air tempering apparatus and, because of the low viscosity in the range of the melting temperatures (log (η/cP)=2 at approximately 1,450° C.), many refining agents, such as, for example, NaCl and KCl, cannot be used.

This also applies to JP A 61 024 344, in which the melting temperature is also too low for sodium chloride refinement. Moreover, the proportion of $V_2O_5$ that is necessarily required for forming in the float process is detrimental, because, in this case, the $V^{5+}$ ion is reduced in the float bath. Moreover, the $V_2O_5$ has a very detrimental effect also on the very high light transmittance being sought.

Finally, an alkali borosilicate glass with good fire and thermoshock resistance is described in U.S. Pat. No. 5,776, 844. In this case, however, the coefficient of linear thermal expansion lies between $8.0 \cdot 10^{-6}$ $K^{-1}$ and $9.5 \cdot 10^{-6}$ $K^{-1}$ and the strain point lies at only approximately 25 K above that of normal soda-lime glass. In addition, the glasses have a low content of $SiO_2$. Glasses of this type often show a relatively low chemical resistance in comparison to alkali borosilicate glasses with a higher content of $SiO_2$.

DE A 196 43 870 describes alkali borosilicate glasses that are chemically prestressed by ion exchange. The possible field of application of induction cooktops made of specialty glass is described in the specifications JP 2003 086337 A, JP 2003 217811 A, WO 2003/098115 A1, DE 102 43 500 A1, DE 101 22 718 C2, DE 101 50 884 A1, DE 103 551 60, GB 2 079 119 A, U.S. Pat. No. 6,051,821 A, WO 2004/018944 A1, and WO 2012/146860 A1.

Further specifications within the compass of the invention are: DE 37 22 130 A1, DE 40 122 88 C1, EP 0 588 000 B1, WO 96/33954 A2, JP 83145637 A, JP 89093437 A, SU 1284959 A, DE 44 28 235 C1, DE 1496637 A, FR 2389582 A1, JP 82160938 A, DE 588643 A, DE 2413552 A1, EP 1314704 B1, and WO 2012/146860 A1.

SUMMARY

The object of the invention is to overcome the drawbacks and problems discussed above and to provide a borosilicate glass that is suitable for thermally highly stressed applications, such as, for example, in the household sector, as viewing windows for pyrolysis furnaces, as induction cooktops, as function plates in microwave appliances, as panes for fire-resistant glazing, for mechanically highly stressed applications, as panes for pressure glazing, as panes for antiballistic glazing, and for statically high-loadable construction components in the construction sector. In the process, the glass is to be formed such that it does not need to be tempered or chemically prestressed in order to fulfill the requirements placed on its strength.

Therefore, a material that has a temperature resistance of at least 400° C. is required. The strength of the material must be sufficiently high and the thermal expansion sufficiently low that any fracture due to thermally induced stresses is excluded over the course of year-long use of the product. Furthermore, the strength requirements of the relevant standards (for example, EN 60335) shall be fulfilled.

A material is desired that, furthermore, is transparent and has a very small intrinsic color.

Further desired is a material that, moreover, has a very good chemical resistance toward acids (caused by food contamination, for example) and alkali attack (caused by exposure to cleaning agents, for example).

Moreover, the glass shall also fulfill the requirements placed on a fire-resistant glass.

It shall also be possible to decorate this material with coatings on the top side and/or bottom side in such a manner that the above-listed requirements are also fulfilled for the coatings during the service life of the appliance.

Finally, it shall be possible to readily melt the glass in all conventional tub assemblies, as much as possible, and to enable a continuous exchange without problem of the glass of the Duran/Pyrex type or of a glass of density similar to that for the glass according to the invention, without draining the tub. The forming must be feasible by rolling, floating, up drawing, or down drawing.

Materials having these aforementioned properties have been found in specialty alkali borosilicate glasses and specialty lithium aluminosilicate glasses. Although the use of alkali borosilicate glasses for this intended purpose has already been described in GB 2 079 11 A, it is known, however, that the described materials having, for example a composition of 81.1% $SiO_2$, 3.0% $Na_2O$, 13.5% $B_2O_3$, 2.2% $Al_2O_3$ and a coefficient of expansion of $3.3 \times 10^{-6}$ $K^{-1}$ to $4.0 \times 10^{-6}$ $K^{-1}$ can be tempered in conventional air tempering apparatus and only in such a way that the mentioned requirements placed on the temperature resistance and strength can be fulfilled. The same is valid also for the glasses described in WO 2012/1468600 A1. Without subsequent tempering or chemical prestressing of the glass articles, the surface area strength is too low. Other conventional commercial flat borosilicate glasses do not fulfill the requirements.

The above-mentioned object is achieved by the invention as disclosed herein.

Generally used for achieving the object is an alkali borosilicate glass with the following composition:

| | |
|---|---|
| $SiO_2$ | 70-86 wt % |
| $Al_2O_3$ | 0-5.0 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %, | as well as 0-5.0 wt % of further components.

In regard to the generally good chemical resistance of the usual alkali borosilicate glasses, the approach, in contrast to the known glasses, such as Borofloat 33, focuses on reducing the brittleness of the glass. According to another aspect of the invention, a posed object is also to increase the intrinsic strength. According to yet another aspect of the invention, besides these two target parameters, a melting temperature that is not too high is aimed at as yet an additional target parameter.

To this end, the following theoretical considerations and calculations were undertaken, which correlate strength properties with physical parameters of the glass substrate.

The first of these considerations establishes a relation between the intrinsic strength and the coefficient of thermal expansion, which, surprisingly, in comparison to experiment, proves to be pertinent both in terms of its order of magnitude and in terms of the predicted tendency. In accordance therewith, an inverse proportionality applies in approximation between the intrinsic strength and the coefficient of thermal expansion, so that, for example, this results in a lowering of the coefficient of thermal expansion from the value of Borofloat 33, that is, $33 \cdot 10^{-7}$ $K^{-1}$, to a 10% lower value, that is, $30 \cdot 10^{-7}$ and results in an increase in the intrinsic strength by approximately 10%.

The second of these considerations establishes a relation between the brittleness and a mean weighted number of constraints per atom. This mean weighted number of constraints is linked through a linear function, in which additional tabular values such as electronegativities and bond strengths are included, to the composition. In this way, one arrives at a second condition, which, in turn, leads from a desired reduction in the brittleness via an increase in the mean weighted number of constraints per atom to a suitable composition field.

A third condition is derived from the maximally desired melting temperature.

In the following, the considerations put forth in general terms above and the invention will be further discussed.

In regard to the strength, as stated, the intrinsic strength, in particular, will be initially considered, whereby, in terms of the invention, the strength is understood to be the strength shown by the material in its freshly produced state. Measurements of this parameter can, for example, be performed on freshly drawn glass fibers. This intrinsic strength is then also significant for its use when the glass surface is protected against microdamage after its production by a suitable coating or, in general, by surface treatment.

It will be shown in the following that the intrinsic strength is crucially influenced by the coefficient of expansion, so that the object of providing an alkali borosilicate glass that is as strong as possible is achieved by an alkali borosilicate glass having a suitable (as will be shown, as low as possible) coefficient of expansion.

According to H. Föll, lecture notes "Einführung in die Materialwissenschaft I" [Introduction to Materials Science I], Christian Albrechts University Kiel, the limit of the intrinsic strength is reached when the atoms are pulled apart from one another up to the point of inflection of the interatomic potential. The interatomic potential U(r) can be described by a Morse potential, for example.

For simplification, the consideration is restricted to interactions in the direction of stress and transverse effects are neglected. As a result, the structure can be divided into square columns having the cross-sectional area $r_0^2$, where $r_0$ is the equilibrium separation distance of the atoms.

Fracture occurs in this case when the force per atomic column, imposed from the outside, assumes in magnitude the value of the derivative of U at the point of inflection WP of the potential, which means that, for the stress imposed from the outside, it necessarily holds that this stress is equal to the negative derivative divided by $r_0^2$:

$$\sigma_{critical} = -\frac{1}{r_0^2}\left(\frac{dU}{dr}\right)_{WP} \tag{1}$$

For the further calculations, U is expanded around the equilibrium position $r_0$ into a third-order Taylor series, $x=r-r_0$:

$$U(r) = U_0 + \frac{1}{2}U_0'' \cdot x^2 + \frac{1}{6}U_0''' \cdot x^3 + \ldots \tag{2}$$

Notably, the different orders of the Taylor series or the different derivatives of U at $r_0$ are essentially linked to various physical parameters, namely, the second derivative with the modulus of elasticity and the third derivative with the coefficient of thermal expansion.

Both will be discussed below in order to obtain ultimately the relation between the critical stress and hence also the intrinsic strength and the coefficient of expansion.

In order to obtain a positive thermal expansion, the third derivative $U_0'''$ of the potential must be negative. Details of the relation will be discussed further below.

According to the above-mentioned lecture notes, the following is valid:

$$U_0'' = E \cdot r_0 \tag{3}$$

Here, E is the modulus of elasticity and $r_0^3$ is the volume per atom.

The invention is based on the realization that the coefficient of thermal expansion can be written as:

$$\alpha = -\frac{U_0'''}{6 \cdot U_0''^2} c_v \cdot \rho \cdot r_0^2, \tag{4}$$

In said lecture notes, a simplifying relation is used, in which the Boltzmann constant "k" is used for the specific heat per atom and dimension. In contrast to this, in Equation (4), calculation according to the invention is carried out with $(c_v \cdot \rho \cdot r_0^3/3)$, where $c_v$ is the specific heat per unit weight, $\rho$ is the density, and $r_0^3$ is the volume assigned to an atom. (The factor ⅓ ensues from the fact that $c_v$ depends on vibrations in all three spatial directions, but, in this case, only one direction is crucial.)

This relation is also in agreement with the known Grüneisen relation between the coefficient of thermal expansion and the specific heat (see, for example, N. L. Vočadlo, Geoffrey D. Price, The Grüneisen parameter—computer calculations via lattice dynamics, Physics of the Earth and Planetary Interiors, 82 (1994) 261-270).

In regard to the intrinsic strength, the invention is based on the realization that the equations given above can be linked in order to establish a relation between the strength or the critical stress associated therewith and the coefficient of linear thermal expansion. According to the invention, the following is valid for the critical stress in this case:

$$\sigma_{critical} = -\frac{1}{r_0^2}\left(\frac{dU}{dr}\right)_{WP} = \tag{5}$$
$$-\frac{1}{r_0^2}\left(U_0'' \cdot X + \frac{1}{2}U_0''' \cdot X^2\right)_{WP} = \frac{1}{2r_0^2}\frac{U_0''^2}{U_0'''} = -\frac{1}{12}\frac{c_v \cdot \rho}{\alpha}$$

Notably, the critical stress depends in this approximation only on the specific heat per volume ($c_v \cdot \rho$) and the coefficient of expansion. The quality of this approximation depends on how exactly the position of the point of inflection of the potential curve can be determined when the potential curve is described by a third-order Taylor series around the equilibrium position. This exact description is not afforded for very small third-order coefficients and therefore occurs because of the singularity for $\alpha=0$.

For a coefficient of expansion near 10 ppm/K, however, a remarkably good value is obtained. When, as an exemplary embodiment, soda-lime glass is considered (coefficient of expansion; 9 ppm/K, specific heat: 720 J/(kgK), density: 2500 kg/m³; see "Mechanische und physikalische Eigenschaften von Kalk-Natron-Silikatglas und von Borosilikatglas nach EN 572-1 [64] and EN 1748-1 [61]" [Mechanical and Physical Properties of Soda-Lime Silicate Glass and of Borosilicate Glass according to EN 572-1 [64] and EN 1748-1 [61]], www.baunetzwissen.de), then a critical stress of approximately 16 GPa is obtained, which lies in the order of magnitude of observed intrinsic strengths; see C. R.

Kurkjian, P. K. Gupta, R. K. Brow, N. Lower, "The intrinsic strength and fatigue of oxide glasses," Journal of Non-Crystalline Solids 316 (2003) 114-124.

The advantage of the approximation presented here is that this approximation makes clear the relation of the intrinsic strength to the coefficient of expansion. This is not contained in the usual approximation; see Egon Orowan, "Die mechanischen Festigkeitseigenschaften und die Realstruktur der Kristalle" [The Mechanical Strength Properties and the Real Structure of Crystals], Zeitschrift Kristallographie, (A)89 (1934), 327-343, and the related commentary in Prabhat Gupta, "Strength of Glass Fibers," in M. Elices and J. Llorca (Editors), "Fiber Fracture," Elsevier Ltd., 2000, ISBN: 978-0-08-044104-7. This result is also in accord with the experimental findings, according to which the intrinsic strength of silica glass, which has a very low coefficient of expansion, is high in comparison to other glasses; see C. R. Kurkjian, P. K. Gupta, R. K. Brow, N. Lower, "The intrinsic strength and fatigue of oxide glasses," Journal of Non-Crystalline Solids 316 (2003) 114-124.

When, therefore, an intrinsically high-strength glass is to be sought in a family of glasses in which the specific heat per volume changes only slightly, then, in accordance with the invention, the coefficient of expansion of the glass is lowered by variation of the composition, or glass compositions that have as small a coefficient of expansion as possible are chosen.

In terms of the invention, a borosilicate glass that is as strong as possible is understood, in particular, to mean a glass with an intrinsic strength that is further increased in comparison to a conventional commercial Borofloat 33 glass. According to the above statements, this is especially a borosilicate glass with a reduced coefficient of expansion in comparison to Borofloat 33. A reduction of the coefficient of expansion by 10% corresponds to an increase of the intrinsic strength by 10%.

That the reduction of the coefficient of thermal expansion also reduces the magnitude of the thermal stresses arising when temperature gradients exist is an additional effect corresponding to the object of the invention.

The coefficient of expansion is given below in relation to the value at the temperature 210° C., for which there exists a very precise regression function; see Alexander Flügel, "Thermal Expansion Calculation of Silicate Glasses at 210° C., Based on the Systematic Analysis of Global Databases," http://glassproperties.com/expansion/Expansivity_Glass 2006.pdf. This document is also included in the subject of the present application to the full extent in regard to the coefficients tabulated therein.

This regression function is defined (for α in ppm/K) as follows:

$$\alpha(210° C.) = \beta_0 + \sum_{j=1}^{n}\left(\beta_j \cdot C_j + \beta_{j2} \cdot C_j^2 + \sum_{k=j+1}^{n}\beta_{jk} \cdot C_j \cdot C_k\right) \quad (6)$$

Here, $C_j$, $C_k$ are the molar concentrations (in mole percent) of the respective components of the glass composition. The associated coefficients $\beta_0$, $\beta_j$, $\beta_{j2}$, $\beta_{jk}$ are:

| Coefficient | Value |
| --- | --- |
| Axial intercept ($\beta_0$) | 1.7672 |
| $Na_2O$ ($\beta_j$) | 0.4545 |

-continued

| Coefficient | Value |
| --- | --- |
| $Na_2O$ ($\beta_{j2}$) | −0.001198 |
| CaO ($\beta_j$) | 0.1682 |
| $Al_2O_3$ ($\beta_j$) | −0.0641 |
| $Al_2O_3$ ($\beta_{j2}$) | 0.006473 |
| $K_2O$ ($\beta_j$) | 0.5320 |
| $K_2O$ ($\beta_{j2}$) | −0.001710 |
| MgO ($\beta_j$) | 0.0499 |
| $B_2O_3$ ($\beta_j$) | 0.0465 |
| $Li_2O$ ($\beta_j$) | 0.1896 |
| $Li_2O$ ($\beta_{j2}$) | 0.003242 |
| SrO ($\beta_j$) | 0.1717 |
| BaO ($\beta_j$) | 0.3077 |
| $ZrO_2$ ($\beta_j$) | −0.0591 |
| $TiO_2$ ($\beta_j$) | −0.0138 |
| ZnO ($\beta_j$) | 0.0102 |
| PbO ($\beta_j$) | 0.1345 |
| F ($\beta_j$) | 0.1305 |
| $Na_2O*CaO$ ($\beta_{jk}$) | −0.002579 |
| $Na_2O*B_2O_3$ ($\beta_{jk}$) | −0.005640 |
| $Na_2O*Li_2O$ ($\beta_{jk}$) | 0.018869 |
| $CaO*MgO$ ($\beta_{jk}$) | 0.002627 |
| $CaO*B_2O_3$ ($\beta_{jk}$) | −0.002682 |
| $CaO*BaO$ ($\beta_{jk}$) | −0.011958 |
| $K_2O*B_2O_3$ ($\beta_{jk}$) | −0.012682 |

As exemplary embodiment for calculation by means of the regression formula, a borosilicate glass with the composition of the known Borofloat 33 will be considered first of all, namely, 81 weight % $SiO_2$, 12.5 weight % $B_2O_3$, 2.5 weight % $Al_2O_3$, 3.5 weight % $Na_2O$, 0.5 weight % $K_2O$, (that is, after conversion, 83.53 mol % $SiO_2$, 11.12 mol % $B_2O_3$, 1.52 mol % $Al_2O_3$, 3.5 mol % $Na_2O$, 0.33 mol % $K_2O$). Accordingly, the glass has a thermal expansion of 3.69 ppm/K at 210° C. In order to achieve an increase in the intrinsic strength in comparison to this glass, the glass composition is altered according to the invention in such a way that a reduction in the thermal expansion occurs. Because a drastic reduction in the thermal expansion is detrimental to the fusability, this reduction must occur in small steps. For comparison: at the end of a successive reduction in the thermal expansion, quartz glass lies at approximately 0.6 ppm/K at 210° C., but a melting point of approximately 2700° C. Melting point is understood here in accordance with A. Flügel, Glass viscosity calculation based on a global statistical modelling approach, Glass Technol. Eur. J. Glass Sci. Technol. A, February 2007, 48 (1), 13-30, to mean the temperature at which the viscosity is 10**1.5 Pascal seconds. This point can be estimated for nearly anhydrous quartz glass, according to M. L. F. Nascimento, E. D. Zanotto, Diffusion processes in vitreous silica revisited, Phys. Chem. Glasses: Eur. J. Glass Sci. Technol. B, August 2007, 48 (4), 201-217, to be approximately 2700° C.

Therefore, according to an embodiment of the invention, the composition accordingly chosen from the above-given composition range of alkali borosilicate glasses with 70-86 wt % $SiO_2$, 0-5 wt % $Al_2O_3$, 9.0-25 wt % $B_2O_3$, 0.5-5.0 wt % $Na_2O$, 0-1.0 wt % $K_2O$, 0-1.0 wt % $Li_2O$, as well as 0-5.0 wt % of further components, will be one for which the thermal expansion at 210° C. according to Equation (17) lies at maximally 3.6 ppm/K, preferably at maximally 3.5 ppm/K, more preferably at maximally 3.4 ppm/K, most preferably at maximally 3.3 ppm/K. In order to achieve a high intrinsic strength, it is also possible to achieve even lower coefficients of expansion by choice of the glass components. In particular, the coefficient of linear thermal expansion can lie at 3.2 ppm/K at most, preferably at maximally 3.1 ppm/K, more preferably at maximally 3.0 ppm/K.

The invention is based, in particular, also on the realization that the brittleness can be ascribed in approximation to the composition and, indeed, via a weighted crosslinking index. The magnitude of the force required for producing a permanent indent ("dimpling;" see Trevor Wilantewicz, Army Research Laboratory Report ARL-TR-5180, May 2010), can also be ascribed according to the invention to the weighted crosslinking index. The brittleness can be defined in the sense of J. Sehgal, S. Ito, Brittleness of glass, Journal of Non-Crystalline Solids, Volume 253, Numbers 1-3, August 1999, pages 126-132, or the c/a value equivalent to it in the case of a strong test force value (ratio of the mean half median-radial crack length to the half indenter width). The c/a value is more or less a measure of the normalized distance from the damage center point at which the damage comes to a "dead rest"; see Trevor Wilantewicz, Crack Initiation Behaviour of Optical Glasses from Vickers Indentation, Ph.D. Thesis, Alfred University, Alfred, N.Y., USA, 2005, the disclosure of which is included here to the full extent in regard to the determination of the c/a value disclosed therein as well as the magnitude thereof.

In this case, the invention provides a method for determining such a crosslinking index and for choosing suitable glasses with low brittleness.

The prior art before the invention is essentially described in, for example, P. Boolchand, "Intermediate phases, reversibility windows, stress-free and non-aging networks, and strong liquids," Chalcogenide Letters Vol. 3, No. 2, March 2006, p. 29-31. In accordance therewith, it is possible to estimate important glass properties when the mean number of constraints that an atom in a glass network is subject to is determined. If an atom has r neighbors (r=coordination number), then, from the r separation distance constraints to these neighbors, there ensue r/2 separation distance constraints that are to be assigned to this atom if the separation distance constraints are distributed equally between the two bonding partners. From the bonding angles between these neighbors, with the atom under consideration at the apex of the respective angle, there ensue further 2r-3 angle constraints that are to be assigned to this atom; see P. Boolchand, M. F. Thorpe, "Glass-forming tendency, percolation of rigidity, and onefold-coordinated atoms in covalent networks," Phys. Rev. B 50, No 14 (1994), pp. 10366-10368, as well as M. F. Thorpe, J. Non-Cryst. Solids 57, 355 (1983), H. He and F. Thorpe, Phys. Rev. Lett. 54, 2107 (1985).

For a total number of constraints of three, the number of constraints per atom is exactly equal to the number of degrees of freedom per atom; see once again P. Boolchand, M. F. Thorpe, "Glass-forming tendency, percolation of rigidity, and onefold-coordinated atoms in covalent networks," Phys. Rev. B 50, No 14 (1994), pp. 10366-10368. Such a material is referred to as being "rigid." If the number of constraints per atom is smaller than 3, then several possible configurations exist; that is, the glass has configurational degrees of freedom. According to the simple picture developed here, these can be transformed into one another without the supply of energy; actually, they differ somewhat in terms of energy. Such a system is referred to as being "floppy."

Besides these two cases, there also is the case of "over-constraint rigid," in which the number of constraints is greater than the degrees of freedom and which can only be realized by supplying the system with energy to violate one or more of the constraints.

An example for a "rigid" system is silica glass. At first, it appears as if the number of constraints per atom is greater than 3. If the coordination number 4 is taken for silicon and the coordination number 2 for oxygen, then one obtains $4/2_+2·4-3=7$ constraints per silicon atom and $2/2+2·2-3=2$ constraints per oxygen atom and thus a mean number of constraints per atom of $11/3=3.67$. According to M. Zhang, P. Boolchand, "The Central Role of Broken Bond-Bending Constraints in Promoting Glass Formation in the Oxides," Science, New Series, Vol. 266, No. 5189 (1994), 1355-1357, however, the angle constraints relative to the oxygen can be neglected (which, moreover, corresponds to the glass formation rules of Zachariasen—compare W. H. Zachariasen, J. Am. Chem. Soc. 54 (1932), 3841)—so that, per atom, a mean number of constraints of $9/3=3$ is obtained. Thus, the number of configurational degrees of freedom is zero according to this consideration. This is in accord with the extremely small jump in the specific heat in the temperature range of the glass transition; see R. Brüning, "On the glass transition in vitreous silica by differential thermal analysis measurements," Journal of Non-Crystalline Solids 330 (2003) 13-22. (Actually, the number of configurational degrees of freedom is not exactly equal to zero, but very small.)

The "thawing" of the configurational degrees of freedom of the glass is reflected in the mentioned jump in the specific heat, said configurational degrees of freedom contributing at higher temperatures, that is, at temperatures above the glass transition, to the specific heat. The magnitude of this jump is a measure of the number of configurational degrees of freedom; see Charles Austen Angell, Thermodynamic aspects of the glass transition in liquids and plastic crystals, Pure & Appl. Chem., Vol. 63, No. 10, pp. 1387-1392, 1991, and M. L. F. Nascimentoa, C. Aparicio, Viscosity of strong and fragile glass-forming liquids investigated by means of principal component analysis, Journal of Physics and Chemistry of Solids 68 (2007) 104-110.

Multicomponent glasses, which, in addition, contain aluminum, boron, and alkali ions and, if appropriate, also alkaline earth ions, will now be considered, with the proviso that the molar proportion of aluminum oxide is smaller than the sum of the molar proportions of the alkali oxides and, if appropriate, additionally the alkaline earth oxides. In this case, it may be assumed that the entire aluminum is present in fourfold coordination with oxygen—see M. Bertmer, L. Züchner, J. C. C. Chan, H. Eckert, J. Phys. Chem. B 104 (2000) 6541, J. C. C. Chan, M. Bertmer, H. Eckert, J. Am. Chem. Soc. 121 (1999) 5238, L. Züchner, J. C. C. Chan, W. Müller-Warmuth, H. Eckert, J. Phys. Chem. B 102 (1998) 4495—and that a corresponding proportion is present distributed unbonded to sodium ions in the glass network. What results for the corresponding aluminum atoms (as above for the silicon atoms), first of all, are 2 respective separation distance constraints and 5 respective angle constraints and, for the corresponding oxygen atoms (a portion of which are "taken" from the alkali oxides or alkaline earth oxides), 1 respective separation distance constraint. (The angle constraints applying to the oxygen are neglected as above.)

Furthermore, according to the invention, only alkali borosilicate glasses are used in accordance with the above-given composition range and, in particular, in this case, alkali borosilicate glasses that, as cations, contain exclusively silicon, boron, aluminum as well as alkalis and/or alkaline earths. Further considered below are those alkali borosilicate glasses for which the difference of the sum of all alkali oxides and, if appropriate, additionally the alkaline earth oxides, and $Al_2O_3$ (in mole percent) is less than 0.7 times the proportion of $B_2O_3$ (in mole percent). In this case, for all compositions that fall under the above-given definition of "alkali borosilicate glass" and for technical cooling, it may be assumed that as much mole percent of $B_2O_3$ is transformed into boron coordinated fourfold with oxygen as corresponds to the mentioned difference; see Y. H. Yun, P. J. Bray, "Nuclear magnetic resonance studies of the glasses in the system $Na_2O$—$B_2O_3$—$SiO_2$," J. Non-Cryst. Solids 1978, 27, 363-380; W. J. Dell, P. J. Bray, S. Z. Xiao, "$^{11}B$ NMR studies and structural modelling of $Na_2O$—$B_2O_3$—$SiO_2$ glasses with high soda content," J. Non-Cryst. Solids 1983, 58, 1-16; Hiroshi Yamashita, Kazuhiko Inoue, Takeshi Nakajin, Hyuma Inoue, Takashi Maekawa, "Nuclear magnetic resonance studies of $0.139MO$ (or $M'2O)\cdot 0.673SiO_2\cdot(0.188-x)Al_2O_3\cdot xB_2O_3$ (M=Mg, Ca, Sr and Ba, M'=Na and K) glasses"; Jingshi Wu, Jonathan F. Stebbins, "Temperature and modifier cation field strength effects on aluminoborosilicate glass network structure," Journal of Non-Crystalline Solids 362 (2013) 73-81.

Three constraints per atom, as above for silicon and for fourfold coordinated silicon, apply to the boron atoms that, in accordance therewith, have been transformed to fourfold coordination and to the associated oxygen atoms (a portion of which are "taken" from the alkali oxides or alkaline earth oxides). For the remaining atoms, boron atoms present in threefold coordination and the associated oxygen atoms—see Jingshi Wu, Jonathan F. Stebbins, "Temperature and modifier cation field strength effects on aluminoborosilicate glass network structure," Journal of Non-Crystalline Solids 362 (2013) 73-81-3/2+2·3-3=4.5 constraints per boron atom and 1 constraint per oxygen atom are applicable, that is, on average, $(9+3)/5=2.4$ constraints per atom.

In regard to the alkali ions and alkaline earth ions, it initially remains an open question as to how many neighboring oxygen atoms are to be assumed, because, in the case of a predominantly ionic bond, the coordination number need not be equal to the valence. However, if one proceeds according to Zachariasen, who requires that the coordination number of oxygen is always "2" for glass-forming systems, it must be assumed in order to satisfy electroneutrality for the alkalis that there is one neighboring oxygen and for the alkaline earths two neighboring oxygens, so that, for the alkali oxides and alkaline earth oxides, two respective separation distance constraints ensue, thus ⅔ constraints per atom for the alkali oxides and 1 constraint per atom for the alkaline earth oxides. Angle constraints are not calculated for the alkalis and alkaline earths because of their predominantly ionic bonding.

For a system falling within the above-mentioned composition range, it is now possible to calculate directly a mean number of constraints per atom via the molar mixing ratio by dividing the number of constraints for one mole of the respective composition by the number of atoms.

This mean number of constraints per atom can be regarded as the crosslinking index, because the number of constraints per atom is higher, the more the atoms are cross-linked with one another.

Known also is the approach that the Vickers hardness grows in proportion to an increasing mean number of constraints per atom; see Morten M. Smedskjaer, John C. Mauro, Randall E. Youngman, Carrie L. Hogue, Marcel Potuzak, and Yuanzheng Yue, "Topological Principles of Borosilicate Glass Chemistry," J. Phys. Chem. B 2011, 115, 12930-12946. In this publication, however, the procedure differs at two points in comparison to the procedure according to the invention: the angle constraints for oxygen are also counted therein in the calculation of the hardness, alkalis and alkaline earths for which the oxygen "has been taken" by aluminum or boron are not valid as being components of the network and are not included in the calculation of the number of constraints per atom.

Furthermore, according to the above-given publication, two constraints are additionally counted for all alkalis from which the oxygen of aluminum or boron has not "been taken" because of the grouping tendency of alkalis. This is not opposed to the procedure according to the invention, because, among the compositions according to the invention, there are none for which the oxygen has not been completely taken from the alkalis or alkaline earths.

According to the above-cited publication, Morten M. Smedskjaer, John C. Mauro, Randall E. Youngman, Carrie L. Hogue, Marcel Potuzak, and Yuanzheng Yue, "Topological Principles of borosilicate Glass Chemistry," J. Phys. Chem. B 2011, 115, 12930-12946, the following formula is used:

$$H_v = \text{const.} \cdot (n-2,5) \tag{7}$$

$H_v$ is the Vickers hardness, n is the mean number of constraints per atom, and 2.5 is the lower limit found by the authors for a "hard" material.

The authors have found a confirmation of the postulated relation (7) for the glasses in the system $SiO_2$—$B_2O_3$—$CaO$—$Na_2O$ investigated by them.

However, this method cannot be applied in a straightforward manner to the brittleness addressed here in terms of the above-discussed c/a value. It is at this point that the invention comes into play.

Whereas the hardness is a measure of the resistance to deformation, the c/a value in each case is based on a fracture. Because the macroscopic fracture also includes the microscopic breaking of bonds in each case, the bond strengths have to be included in an expression that can be correlated with the fracture toughness. To this end, according to the invention, the above-given constraints are weighted with the bond strengths. This relates to both types of constraints, both the angle constraints as well as the separation distance constraints.

The angle constraints also need to take into consideration the different magnitude of the ionic bonding proportion of the respective bond, depending on the cation involved.

Therefore, corresponding weighting factors will be introduced. Because the angle constraints are a consequence of covalent bonds, all angle constraints are weighted with a degree of covalence K, which is defined as one minus the respective ionic bond proportion of the M-O bond (M=Si, Al, B, alkali, alkaline earth). This ionic bond proportion can be interpreted as the probability that the bonding partner is present in ionized form. Conversely, the angle constraints are weighted in the way developed here with the probability that the partners are present in covalently bond form.

The ionic bond proportion I of each single bond is calculated according to Linus Pauling, "The Nature of the Chemical Bond," Cornell University Press, New York, 1960, from the difference of the tabular electronegativities of the anion ($x_A$) and the cation ($x_K$) therein:

$$K = 1 - I, I = 1 - e^{-\frac{(x_A - x_K)^2}{4}} \tag{8}$$

In regard to the already recognized uniqueness of $SiO_2$ as a "strong glass former"—see Charles Austen Angell, Thermodynamic aspects of the glass transition in liquids and plastic crystals, Pure & Appl. Chem., Vol. 63, No. 10, pp. 1387-1392, 1991—the classification of $SiO_2$ glass should not be influenced in this case. For this reason, all degrees of covalence are normalized by dividing them by the degree of covalence of the Si—O bond.

As a result, it is no longer necessary, first of all, to decide which bonds are to be evaluated as being predominantly ionic and which as predominantly covalent. Because of the predominant ionic bonding, angle constraints are still not calculated for the alkalis and alkaline earths.

Secondly, all constraints, both the separation distance constraints and the angle constraints, are weighted with the bond strengths of the respective single M-O bond ("single bond strength"). It is normalized by dividing by the bond strength of the single Si—O bond. The bond strengths may be taken from V. Dimitrov, T. Komatsu, "An interpretation of optical properties of oxides and oxide glasses in terms of the electronic polarizability and average single bond strength (Review)," Journal of the University of Chemical Technology and Metallurgy, 45, 3, 2010, 219-250.

These bond strengths are calculated by dividing the dissociation energy $e_d$ associated with a cation by the number of oxygen atoms surrounding the cation, that is, the coordination number. If a coordination number different from that based on Dimitrov and Komatsu is taken, then a corresponding conversion is required.

This conversion does not otherwise affect the weighted number of separation distance constraints according to the method given here, because, in the calculation thereof, the coordination number is cancelled out. The number of separation distance constraints is r/2, with r being the coordination number (see above); the weighting factor is $e_d$/r/bond strength of the Si—O bond and the weighted number of separation distance constraints for a cation is thus found to be $e_d$/2/bond strength of the Si—O bond.

For this reason, it may generally be assumed that the coordination number is equal to the valence of the respective cation; accordingly, the coordination number of the oxygen is also always "2," in agreement with Zachariasen. The angle constraints, too, are treated reasonably by this approach. The angle constraints are only valid for the case that the cation is covalently bonded (which becomes increasingly less likely with the increasing electronegativity difference in relation to oxygen); in this case, however, the coordination number is generally equal to the valence.

Exceptions are those cations that are able to undergo a change in coordination and are also predominantly covalently bonded in the new coordination (by hydridization), namely, boron and aluminum. Accordingly, the above procedure is followed.

For reasons of simplicity, all separation distance constraints can refer to the cations and the following total number N of constraints per mole (as stated above, consideration is given only to the case that the molar proportion of aluminum oxide is smaller than the sum of the molar proportions of the alkali oxides and, if appropriate, additionally the alkaline earth oxides, that, as cation, exclusively silicon, boron, aluminum as well as alkalis and/or alkaline earths are present, and that the difference of the sum of all alkali oxides and, if appropriate, additionally the alkaline earth oxides, and $Al_2O_3$ (in mole percent) is less than 0.7 times the proportion of $B_2O_3$ (in mole percent)):

$$\frac{N}{N_A} = c(SiO_2) \cdot 9 + c(Al_2O_3) \cdot 2 \cdot \left(4 + 5 \cdot \frac{K(Al-O)}{K(Si-O)}\right) \cdot \frac{e_d(Al-O)/4}{e_d(Si-O)/4} + \quad (9a)$$

$$\left(\sum_i c(M_2^i O) + \sum_j c(M^j O) - c(Al_2O_3)\right) \cdot$$

-continued $$2 \cdot \left(4 + 5 \cdot \frac{K(B-O)}{K(Si-O)}\right) \cdot \frac{e_d(B-O)/4}{e_d(Si-O)/4} +$$

$$\left(c(B_2O_3) + c(Al_2O_3) - \sum_i c(M_2^i O) - \sum_j c(M^j O)\right) \cdot$$

$$2 \cdot \left(3 + 3 \cdot \frac{K(B-O)}{K(Si-O)}\right) \cdot \frac{e_d(B-O)/3}{e_d(Si-O)/4} +$$

$$\sum_i c(M_2^i O) \cdot 2 \cdot \frac{e_d(M'-O)}{e_d(Si-O)/4} + \sum_j c(M^j O) \cdot 2 \cdot \frac{e_d(M^j-O)/2}{e_d(Si-O)/4}$$

Here, c represents the molar concentrations, $M^i$ the alkalis, and $M^j$ the alkaline earths. The K(M-O) values are the degree of covalence of the respective M-O bond; the $e_d$(M-O) values represent the respective cation-related dissociation energies. NA is Avogadro's number.

The number n of constraints per atom is obtained from $N/N_A$ by division by the molar proportions of individual oxides, which are multiplied by the number of atoms per oxide and then summed:

$$n = \frac{N}{N_A} \bigg/ \left(c(SiO_2) \cdot 3 + c(Al_2O_3) \cdot 5 + \right. \quad (9b)$$

$$\left. c(B_2O_3) \cdot 5 + \sum_i c(M_2^i O) \cdot 3 + \sum_j c(M^j O) \cdot 2\right)$$

In contrast to Morten M. Smedskjaer, John C. Mauro, Randall E. Youngman, Carrie L. Hogue, Marcel Potuzak, and Yuanzheng Yue, "Topological Principles of Borosilicate Glass Chemistry," J. Phys. Chem. B 2011, 115, 12930-12946, the angle constraints for oxygen are not included in the count, but alkalis and alkaline earths from which the oxygen has "been taken" by aluminum or boron are taken into consideration in calculating the number of constraints per atom.

The degrees of covalence and dissociation energies are presented in a table below for the oxides that are decisive here. The degrees of covalence are calculated from the Pauling electronegativities—Linus Pauling, "The Nature of the Chemical Bond," Cornell University Press, New York, 1960—according to formula (8). Besides the dissociation energies from either V. Dimitrov, T. Komatsu, "An interpretation of optical properties of oxides and oxide glasses in terms of the electronic polarizability and average single bond strength (Review)," Journal of the University of Chemical Technology and Metallurgy, 45, 3, 2010, 219-250, or Kuan-Han Sun, "Fundamental Condition of Glass Formation," Journal of The American Ceramic Society 69, 1947, 277-281, the determination of the given values involves the calculation of the dissociation energies of the respective oxides as sums of the respective standard enthalpies of formation plus the enthalpies for the transition of the involved elements from the standard state to a monoatomic gas. The standard enthalpies of formation as well as the enthalpies for the transition of the involved elements from the standard state to a monoatomic gas may be taken from the table "Standard Thermodynamic Values at 25° C." of the website "http://www.chemistry-reference.com/," which, as source, in turn, gives Dean, John A., Lange's Handbook of Chemistry, 11th ed., McGraw-Hill, New York, N.Y., 1979, pp. 9:4-9:128 as well as Lide, David R., CRC Handbook, 84th ed., CRC Press, Boca Raton, Fla., 2003; pp. 5:5-5:60, 5:85-5:86.

| Oxide | ed*/(kJ/mol) (Dimitrov/Komatsu) | ed*/(kJ/mol) (our own calculation) | Degree of covalence |
|---|---|---|---|
| $SiO_2$ | 1772 | 1864 | 0.5527 |
| $B_2O_3$ | 1494 | 1572.5 | 0.6126 |
| $Al_2O_3$ | 1506 | 1537 | 0.4329 |
| $Li_2O$ | 600 | 585 | 0.2202 |
| $Na_2O$ | 486 | 440.5 | 0.2070 |
| $K_2O$ | 500 | 395 | 0.1797 |
| MgO | 930 | 999 | 0.3216 |
| CaO | 1064 | 1063 | 0.2257 |
| For comparison: | | | |
| Oxide | ed/(kJ/mol) (Sun) | ed/(kJ/mol) (our own calculation) | Degree of covalence |
| PbO | 607 | 664 | 0.5104 |

*ed = dissociation energy

The calculations shown below are based on the dissociation energies according to our own calculation.

The mean number of constraints per atom thus determined represents the weighted crosslinking index being sought.

For pure silica glass $SiO_2$, a weighted crosslinking index of "3" results according to the design. For Pyrex® with the composition of 81 mol % $SiO_2$, 13 mol % $B_2O_3$, 2 mol % $Al_2O_3$, and 4 mol % $Na_2O$—see Trevor Wilantewicz, Crack Initiation Behaviour of Optical Glasses from Vickers Indentation, Ph.D. Thesis, Alfred University, Alfred, N.Y., USA, 2005—a weighted crosslinking index of "2.883" is obtained. For pure borate glass $B_2O_3$, a weighted crosslinking index of "2.845" is obtained.

For float glass with the composition of 70.3 mol % $SiO_2$, 0.4 mol % $Al_2O_3$, 9.3 mol % CaO, 6.1 mol % MgO, 13.7 mol % $Na_2O$, 0.1 mol % $K_2O$—see Trevor Wilantewicz, Crack Initiation Behaviour of Optical Glasses from Vickers Indentation, Ph.D. Thesis, Alfred University, Alfred, N.Y., USA, 2005—a weighted crosslinking index of "2.449" is initially obtained. If the calculation is performed as in Morten M. Smedskjaer, John C. Mauro, Randall E. Youngman, Carrie L. Hogue, Marcel Potuzak, and Yuanzheng Yue, "Topological Principles of Borosilicate Glass Chemistry," J. Phys. Chem. B 2011, 115, 12930-12946, then, for all alkalis from which the oxygen has not been taken and which consequently belong to the network in the sense of Smedskjaer et al., two constraints are additionally counted because of the grouping tendency of the alkalis. This relates to 13.4 mol % $Na_2O$. (It may be assumed that the transition of the aluminum atoms to tetrahedral coordination by incorporation of oxygen atoms, which come from the alkali oxides and alkaline earth oxides, occurs first and foremost at the expense of the potassium atoms, because they have the lowest bond enthalpies of all alkali and alkaline earth atoms: see above table. Analogously, this transition occurs to a secondary extent at the expense of the sodium atoms. The transition is complete; that is, when the amount of alkalis present is sufficient, all aluminum atoms undergo transition to fourfold coordination: see B. H. W. S. DeJong, C. M. Schramm, and V. Eparziale, Polymerization of silicate and aluminate tetrahedra in glasses, melts, and aqueous solutions—IV. Aluminum coordination in glasses and aqueous solutions and comments on the aluminum avoidance principle, Geochimica et Cosmochimica Acta Vol. 47, 1983, 1223-1236. The problem of avoiding Al—O—Al bonds is not posed for the small quantity of aluminum that is present. For the transition of 0.4 mol % $Al_2O_3$, the 0.1 mol % $K_2O$ that is present is completely consumed. Furthermore, 0.3 mol % $Na_2O$ is consumed, so that 13.4 mol % $Na_2O$ remains left over as network components. From this ensues 2*2*0.134 mole=0.536 mole of additional constraints per mole of oxides. Weighted with the factor $e_d$(Na—O)/($e_d$(Si—O)/4), this gives 0.506 mole of additional constraints per mole of oxides. Each mole of oxides contains 0.703*3 mole of atoms from $SiO_2$, 0.004*5 mole of atoms from $Al_2O_3$, 0.093*2 mole of atoms from CaO, 0.061*2 mole of atoms from MgO, 0.137*2 mole of atoms from $Na_2O$, and 0.001*2 mole of atoms from $K_2O$, that is, in total 2.851 moles of atoms. Accordingly, there result 0.1777 additional constraints per atom, so that the weighted crosslinking index for the float glass considered here is 2.626.

For the calculation of the weighted crosslinking index of a glass having a high lead content with the composition of 13 mol % $SiO_2$, 6 mol % $Al_2O_3$, 22 mol % $B_2O_3$, 58 mol % PbO—see Trevor Wilantewicz, Crack Initiation Behaviour of Optical Glasses from Vickers Indentation, Ph.D. Thesis, Alfred University, Alfred, N.Y., USA, 2005—information on the coordination etc. of the aluminum, the boron, and the lead is first of all required; for the last of these, this information also depends on the changing character as network former or network transformer. Whereas $Pb^{2+}$, in small molar proportions, assumes the role of an ionically bonded network transformer and delivers the introduced oxygen to aluminum or boron, which makes possible the tetrahedral coordination of these atoms, the covalent bond predominates for large molar proportions; see A. Sawvel, S. Chinn, W. Bourcier, R. Maxwell, Local Structure of Amorphous $(PbO)_x[(B_2O_3)_{1-z}(Al_2O_3)_z]_y(SiO_2)_y$ Dielectric Materials by Multinuclear Solid State NMR, Lawrence Livermore National Laboratory, UCRL-JRNL-200058, Sep. 9, 2003. In the range around 60 mol % PbO, the proportion of boron atoms present in tetrahedral coordination is reduced to approximately ⅓ and, in PbO—$B_2O_3$—$Al_2O_3$—$SiO_2$ glass, to nearly zero when sufficient aluminum is present, because the aluminum is preferred in comparison to boron with the change to tetrahedral coordination; see A. Sawvel, S. Chinn, W. Bourcier, R. Maxwell, Local Structure of Amorphous $(PbO)_x[(B_2O_3)_{1-z}(Al_2O_3)_z]_y(SiO_2)_y$ Dielectric Materials by Multinuclear Solid State NMR, Lawrence Livermore National Laboratory, UCRL-JRNL-200058, Sep. 9, 2003. For the composition of a glass with a high lead content, presented in Trevor Wilantewicz, Crack Initiation Behaviour of Optical Glasses from Vickers Indentation, Ph.D. Thesis, Alfred University, Alfred, N.Y., USA, 2005, it may be assumed that, without the simultaneous presence of aluminum oxide, approximately ⅓ of the 22 mol % $B_2O_3$ would be transformed to tetrahedrally coordinated boron, but, because of the 6 mol % $Al_2O_3$ that is present, as well as virtually no boron, the entire amount of aluminum is tetrahedrally coordinated. For this, 6 mol % PbO, which is ionically bonded, is "consumed." The remaining 52 mol % is covalently bonded. Covalently bonded $Pb^{2+}$ exists in glass in threefold or fourfold coordination; see T. Takaishi, J. Jin, T. Uchino, and T. Yoko, Structural Study of PbO—$B_2O_3$ Glasses by X-ray Diffraction and $^{11}B$ MAS NMR Techniques, J. Am. Ceram. Soc., 83, 2000, 2543-48. For lead borate glasses, to which the glass having a high lead content given in Trevor Wilantewicz, Crack Initiation Behaviour of Optical Glasses from Vickers Indentation, Ph.D. Thesis, Alfred University, Alfred, N.Y., USA, 2005, belongs in approximation because of the small proportions of $SiO_2$ and $Al_2O_3$, a threefold coordination is given by T. Takaishi, J.

Jin, T. Uchino, and T. Yoko, Structural Study of PbO—B$_2$O$_3$ Glasses by X-ray Diffraction and $^{11}$B MAS NMR Techniques, J. Am. Ceram. Soc., 83, 2000, 2543-48; they also give such a coordination for the associated oxygen, this preserving the charge neutrality. In accordance herewith, the 52 mol % covalently bonded lead is counted as threefold covalently bonded in the calculation of the angle constraints, whereas, for the 6 mol % of ionically bonded lead, no angle constraints are counted. Angle constraints at oxygen, for which, in this case, the Zachariasen rules would be violated, are neglected here as well. Accordingly, the glass having a high lead content has a weighted crosslinking index of 2.23 and thus lies markedly lower than that of the other glasses mentioned, this being ascribed, first and foremost, to the very low e$_d$ value of PbO in comparison to CaO, for example.

If the weighted crosslinking indexes calculated for the glasses chosen here are compared with the c/a values from Trevor Wilantewicz, Crack Initiation Behaviour of Optical Glasses from Vickers Indentation, Ph.D. Thesis, Alfred University, Alfred, N.Y., USA, 2005, then a good correlation "high weighted crosslinking index—low c/a value (that is, low brittleness)" is found. The glasses with a higher weighted crosslinking index (silica glass, Pyrex®, and pure borate glass) belong to the top group in terms of the c/a value, the float glass considered here to the middle field, and the glass with a high lead content to the especially brittle glasses. For the three glasses silica glass, Pyrex®, and pure borate glass, the sequence resulting during sorting according to decreasing weighted crosslinking index is in fact exactly the same as that according to increasing c/a value. The c/a value relates to the stress with a Vickers indenter and 1-kg load.

| Glass | Weighted crosslinking index | c/a value (Wilantewicz) |
| --- | --- | --- |
| Silica glass | 3 | 1.58 |
| Pyrex ® | 2.883 | 1.78 |
| Pure borate glass | 2.845 | 2.13 |
| Float glass | 2.626 | 2.89 |
| Lead glass | 2.23 | 4.49 |

The same hierarchy among silica glass, borosilicate glass, and (soda-lime) float glass is obtained, moreover, in regard to the magnitude of the force required for producing a permanent indent ("dimpling"); see Trevor Wilantewicz, Army Research Laboratory Report ARL-TR-5180, May 2010. The threshold above which "dimpling" was observed for all samples examined therein under load with a spherical indenter was 100 N for silica glass, 35 N for borosilicate glass, and 30 N for soda-lime float glass. In this case, the borosilicate glass was not Pyrex®, but rather Borofloat 33® with a composition in weight percent of 81% SiO$_2$, 12.5% B$_2$O$_3$, 2.5% Al$_2$O$_3$, 3.50% Na$_2$O, and 0.5% K$_2$O, that is, a molar composition of 83.53% SiO$_2$, 11.12% B$_2$O$_3$, 1.52% Al$_2$O$_3$, 3.50% Na$_2$O, and 0.33% K$_2$O, and a weighted crosslinking index of 2.893. In this case, the soda-lime float glass was Starphire® with a composition in weight percent of 73.2% SiO$_2$, 14.7% Na$_2$O, 10.28% CaO, 1.44% Al$_2$O$_3$, and further components of less than 0.5% in total, which are neglected; see Advances in Ceramic Armor VIII: Ceramic Engineering and Science Proceedings, Volume 33, Issue 5, 2012, edited by J. J. Swab, Volume editors M. Halbig, S. Mathur, Wiley, Hoboken, N.J., USA. This composition corresponds in mole percent to 73.43% SiO$_2$, 14.29% Na$_2$O, 11.05% CaO, 0.85% Al$_2$O$_3$. Analogously to the above-described (soda-lime) float glass of different composition, the weighted crosslinking index is calculated to be 2.67.

In terms of the invention, an alkali borosilicate glass with a brittleness that is as low as possible is understood, in particular, to be one with a weighted crosslinking index, that is, a mean number of constraints per atom according to formulas (9a) and (9b), of greater than 2.9, preferably greater than 2.91, more preferably greater than 2.92, most preferably greater than 2.93.

In accordance herewith, an alkali borosilicate glass with high strength is provided according to the invention, having the following components:

| | |
| --- | --- |
| SiO$_2$ | 70-86 weight percent |
| Al$_2$O$_3$ | 0-5.0 weight percent |
| B$_2$O$_3$ | 9.0-25 weight percent |
| Na$_2$O | 0.5-5.0 weight percent |
| K$_2$O | 0-1.0 weight percent |
| Li$_2$O | 0-1.0 weight percent, | as well as 0-5.0 weight percent of further components, wherein the proportions of the components are chosen such that the weighted crosslinking index, that is, the mean number n of constraints per atom, given by $$n = \frac{N}{N_A} \bigg/ \left( c(\text{SiO}_2) \cdot 3 + c(\text{Al}_2\text{O}_3) \cdot 5 + c(\text{B}_2\text{O}_3) \cdot 5 + \sum_i c(M_2^i O) \cdot 3 + \sum_j c(M^j O) \cdot 2 \right)$$

has a value greater than 2.9, preferably greater than 2.91, more preferably greater than 2.92, most preferably greater than 2.93, wherein N$_A$ is Avogadro's number and c(SiO$_2$), c(Al$_2$O$_3$), and c(B$_2$O$_3$) refer to the molar concentrations of SiO$_2$, Al$_2$O$_3$, and B$_2$O$_3$, the c(M$^i_2$O) refer to the molar concentrations of the alkali oxides M$^i_2$O present, and the c(M$^j$O) refer to the molar proportions of the alkaline earth oxides present, and wherein the ratio N/N$_A$ is given according to $$\frac{N}{N_A} = c(\text{SiO}_2) \cdot 9 + c(\text{Al}_2\text{O}_3) \cdot 2 \cdot \left(4 + 5 \cdot \frac{K(\text{Al}-\text{O})}{K(\text{Si}-\text{O})}\right) \cdot \frac{e_d(\text{Al}-\text{O})/4}{e_d(\text{Si}-\text{O})/4} +$$

$$\left(\sum_i c(M_2^i O) + \sum_j c(M^j O) - c(\text{Al}_2\text{O}_3)\right) \cdot 2 \cdot \left(4 + 5 \cdot \frac{K(B-O)}{K(\text{Si}-\text{O})}\right) \cdot$$

$$\frac{e_d(B-O)/4}{e_d(\text{Si}-O)/4} + \left(c(\text{B}_2\text{O}_3) + c(\text{Al}_2\text{O}_3) - \sum_i c(M_2^i O) - \sum_j c(M^j O)\right) \cdot$$

$$2 \cdot \left(3 + 3 \cdot \frac{K(B-O)}{K(\text{Si}-O)}\right) \cdot \frac{e_d(B-O)/3}{e_d(\text{Si}-O)/4} +$$

$$\sum_i c(M_2^i O) \cdot 2 \cdot \frac{e_d(M'-O)}{e_d(\text{Si}-O)/4} + \sum_j c(M^j O) \cdot 2 \cdot \frac{e_d(M^j-O)/2}{e_d(\text{Si}-O)/4},$$

where the K(M-O), M=Si, Al, B are the degrees of covalence of the respective M-O bonds of the components SiO$_2$, Al$_2$O$_3$, B$_2$O$_3$, and the e$_d$(M-O) are the respective, cation-related dissociation energies of the components SiO$_2$, Al$_2$O$_3$, B$_2$O$_3$, or the alkali oxides or the alkaline earth oxides. According to a preferred embodiment, the glass further has a coefficient of linear thermal expansion of less than 3.6 ppm/K at a temperature of 210° C., because a low thermal expansion, as shown above, also generally increases the intrinsic strength of the glass. The values of the dissociation energies $e_d$(M-O) and the degree of covalence of the components $SiO_2$, $B_2O_3$, and $Al_2O_3$, are based, in particular, on our own calculated values in the above table.

A method according to the invention for producing a glass element consists correspondingly in choosing a glass composition of a borosilicate glass within the above-given composition range with 70-86 weight percent $SiO_2$ . . . , which satisfies the constraints of Equations (20) and (21) with a value n of greater than 2.9 and, at the same time, has a coefficient of linear thermal expansion of less than 3.6 ppm/K at a temperature of 210° C., in melting a glass of the determined glass composition, and in forming a glass element from the glass melt.

Glass elements produced from the glass according to the invention are suitable for various uses in which the strength and heat resistance is of particular importance. Preferred uses are fire-resistant glazing, facade elements, heat-resistant glazing, in particular for cooking appliances or baking ovens, as well as glass pipeline elements.

As described above, the components of the glass are further preferably chosen in such a way that the regression formula (17) gives a coefficient of linear thermal expansion $\alpha(210°\ C.)$ of less than $3.6 \cdot 10^{-6}\ K^{-1}$. The composition of the glass therefore satisfies both the condition that the weighted crosslinking index, that is, the mean number n of constraints per atom, given by Equation (21), is greater than 2.9 and also that the value of the regression formula (17) is less than $3.6 \cdot 10^{-6}\ K^{-1}$.

According to an enhancement of the invention, also the melting temperature is further taken into consideration in choosing the glass composition. The melting temperature (in degrees Celsius) can also be calculated in approximation by means of a regression formula. This formula is:

$$T = b_0 + \sum_{i=1}^{n} \left[ b_i C_i + \sum_{k=i}^{n} \left( b_{ik} C_i C_k + \sum_{m=k}^{n} b_{ikm} C_i C_k C_m \right) \right] \quad (22)$$

The coefficients $C_{i,k,m}$ refer again to the individual proportions (this time in weight percent) of the glass components and $b_i$, $b_{ik}$, $b_{ikm}$ are coefficients or weighting factors for these components. These factors are listed individually in the European Journal of Glass Science and Technology Part A Volume 48 Number 1, February 2007, the content of which in regard to the tabular values, including the aforementioned factors, is also included to the full extent in the subject of the present invention.

The associated coefficients $b_0$, $b_i$, $b_{jk}$, $b_{jkm}$ are:

| Coefficient | Value |
|---|---|
| $b_0$ | 1824.497 |
| $Al_2O_3$ ($b_i$) | 19.341 |
| $B_2O_3$ ($b_i$) | −22.347 |
| $B_2O_3 \cdot B_2O_3$ ($b_{ii}$) | 0.60376 |
| BaO ($b_i$) | −18.931 |
| $Bi_2O_3$ ($b_i$) | −42.416 |
| CaO ($b_i$) | −17.453 |
| CaO·CaO ($b_{ii}$) | 0.12038 |
| $CeO_2$ ($b_i$) | −22.418 |
| Cl ($b_i$) | −8.563 |
| CuO ($b_i$) | −30.913 |

| Coefficient | Value |
|---|---|
| F | −11.739 |
| $Fe_2O_3$ ($b_i$) | −13.611 |
| $K_2O$ ($b_i$) | −31.907 |
| $K_2O \cdot K_2O$ ($b_{ii}$) | 0.61234 |
| $K_2O \cdot K_2O \cdot K_2O$ ($b_{iii}$) | −0.006662 |
| $Li_2O$ ($b_i$) | −30.336 |
| $Li_2O \cdot Li_2O$ ($b_{ii}$) | 0.22499 |
| MgO (bi) | −5.038 |
| $MnO_2$ (bi) | −17.050 |
| $Na_2O$ ($b_i$) | −30.610 |
| $Na_2O \cdot Na_2O$ ($b_{ii}$) | 0.27887 |
| $Nd_2O_3$ ($b_i$) | −39.662 |
| PbO ($b_i$) | −21.349 |
| $SO_3$ ($b_i$) | −13.908 |
| SrO ($b_i$) | −17.292 |
| $ThO_2$ ($b_i$) | −17.185 |
| $TiO_2$ ($b_i$) | −10.323 |
| $UO_2$ ($b_i$) | −17.672 |
| $V_2O_5$ ($b_i$) | −21.727 |
| ZnO ($b_i$) | −6.280 |
| $ZrO_2$ ($b_i$) | 10.173 |
| $Al_2O_3 \cdot Li_2O$ ($b_{ik}$) | −0.38421 |
| $Al_2O_3 \cdot Na_2O$ ($b_{ik}$) | −0.23085 |
| $Al_2O_3 \cdot MgO$ ($b_{ik}$) | −0.44589 |
| $Al_2O_3 \cdot CaO$ ($b_{ik}$) | −0.93909 |
| $B_2O_3 \cdot Li_2O$ ($b_{ik}$) | −0.16843 |
| $B_2O_3 \cdot Na_2O$ ($b_{ik}$) | −0.28237 |
| $B_2O_3 \cdot K_2O$ ($b_{ik}$) | −0.27890 |
| $Na_2O \cdot Li_2O$ ($b_{ik}$) | 0.20691 |
| $Na_2O \cdot K_2O$ ($b_{ik}$) | 0.58773 |
| $Na_2O \cdot CaO$ ($b_{ik}$) | 0.19254 |
| $K_2O \cdot Li_2O$ ($b_{ik}$) | 0.24924 |
| $K_2O \cdot MgO$ ($b_{ik}$) | 0.59449 |
| $K_2O \cdot CaO$ ($b_{ik}$) | 0.29628 |
| $MgO \cdot CaO$ ($b_{ik}$) | −0.17394 |
| $Al_2O_3 \cdot Na_2O \cdot CaO$ ($b_{ikm}$) | 0.033620 |

As an exemplary embodiment, a borosilicate glass with high strength according to the invention is compared with a borosilicate glass referred to as Borofloat 33. The composition of these glasses is:

| Glass | | $SiO_2$ | $B_2O_3$ | $Al_2O_3$ | $K_2O$ | $Na_2O$ |
|---|---|---|---|---|---|---|
| Borofloat 33 | Composition (weight percent) | 81 | 12.5 | 2.5 | 0.5 | 3.5 |
| Glass 1 | Composition (weight percent) | 79.5 | 16.5 | 1 | 0 | 3 |

First of all, the glass according to the invention (referred to as "Glass 1") with the converted composition of 81.76 mol % $SiO_2$, 14.64 mol % $B_2O_3$, 0.61 mol % $Al_2O_3$, 2.99 mol % $Na_2O$ and the coefficient of expansion at 210° C. of 3.51 ppm/K calculated for it according to the above-given Equation (17) fulfills the condition imposed on glasses according to the invention that the value must lie below 3.6 ppm/K. The weighted crosslinking index is 2.911. Furthermore, the melting temperature at 1535° C. also lies below 1600° C., according to formula (22).

For comparison, Borofloat 33 with the converted composition of 83.53 mol % $SiO_2$, 11.12 mol % $B_2O_3$, 1.52 mol % $Al_2O_3$, 3.50 mol % $Na_2O$, and 0.33 mol % $K_2O$ and the coefficient of expansion at 210° C. of 3.69 ppm/K calculated for it from the above-given Equation (17) does not fulfill the condition imposed on the glasses according to the invention that the value must lie below 3.6 ppm/K. Furthermore, the weighted crosslinking index for Borofloat 33 has the value 2.893 and thus lies below the required minimum value of 2.9 according to the invention. The melting temperature according to formula (22) lies at 1553° C.

Because the melting temperature of the glass according to the invention should not be markedly elevated in comparison to Borofloat 33, but rather lower, the enhancement of the invention consists in having the melting temperature according to Equation (22) lie below 1570° C., preferably below 1560° C., more preferably below 1550° C., most preferably below 1540° C.

Experimentally, the "crack initiation load" (CIL), which correlates roughly with the c/a value and was calculated according to Trevor Wilantewicz, Crack Initiation Behaviour of Optical Glasses from Vickers Indentation, Ph.D. Thesis, Alfred University, Alfred, N.Y., USA, 2005, was found to have a value of 12.3+/−1N for Glass 1 in comparison to 6.9+/−0.4N for Borofloat 33.

The CIL is the force at which, for Vickers indents, on average 2 cracks arise from the corners of the indent. For determination of the CIL, a number of Vickers indents are produced for various indent forces and the cracks arising at the corners are counted. The mean number of cracks is plotted versus the test force and a step-fit function is drawn through the measured points. For this fit function, the smallest value is set at 0 and the largest value at 4. The point of inflection of the curve is the CIL. The maximum force was 20 N. During the measurements, the samples are placed in a test chamber into which a constant flow of dry nitrogen is fed.

Glass compositions chosen using the method according to the invention are to be found distributed over the general composition range with 70-86 weight percent $SiO_2$, etc., because the components mutually influence one another in terms of their effect on the number of constraints and the coefficient of expansion.

Listed in the following table are a number of preferred composition ranges for glasses according to the invention:

|  | Range 1 | Range 2 | Range 3 | Range 4 | Range 5 | Range 6 |
|---|---|---|---|---|---|---|
| | Weight percent | | | | | |
| $SiO_2$ | 79-80 | 81.5-83.5 | 85-86 | 80-82 | 75-77 | 71.2-73.2 |
| $B_2O_3$ | 16-17 | 11.5-13 | 11.5-13 | 14-16 | 19-21 | 23.8-25.8 |
| $Al_2O_3$ | 0.5-1.5 | 2-3 | 0 | 0.5-1.5 | 0.8-2 | 0.5-1.5 |
| $Li_2O$ | 0 | 0 | 0 | 0 | 0 | 0.25-0.75 |
| $Na_2O$ | 2-4 | 2-4 | 1-3 | 2-4 | 2-3 | 0.25-0.75 |
| $K_2O$ | 0 | 0.1-1 | 0 | 0 | 0.05-0.2 | 0.5-1.5 |
| MgO | 0 | 0 | 0 | 0 | 0 | 0 |
| CaO | 0 | 0 | 0 | 0 | 0 | 0 |
| BaO | 0 | 0 | 0 | 0 | 0 | 0 |

In regard to the network formers $SiO_2$ and $B_2O_3$, it is favorable according to an enhancement of the invention, moreover, when their total content, that is, the sum of the contents of $SiO_2$ and $B_2O_3$, lie in the range of 95.5 wt % to 97.5 wt %, preferably in the range of 95.8 wt % to 97.2 wt %, more preferably in this case to 97.1 wt %. Given in mol %, a total content in the range of 95.5 mol % to 97.5 mol %, preferably in the range of 95.7 mol % to 97.2 mol %, more preferably in this case to 97.1 mol %, is favorable. A higher proportion of these network formers is advantageous for a low brittleness. On the other hand, the given upper limits are favorable in order to achieve a high hardness, because the remaining content of other components is increased correspondingly. These further components can be incorporated into the interstices of the glass network and, in this way, increase the hardness of the glass. In other words, the given ranges of the total contents of network formers have proven favorable in order to achieve both a low brittleness and a high hardness.

In the following, a number of exemplary embodiments are listed, which fulfill the parameters according to the invention of $n>2.9$ and $\alpha(210° C.)<3.6\cdot10^{-6} K^{-1}$ and fall under the above-mentioned ranges. In this case, Glass 1 is an exemplary embodiment for Range 1, Glass 2 an exemplary embodiment for Range 2, . . . Glass 6 an exemplary embodiment for Range 6.

|  | Glass 1 | Glass 2 | Glass 3 | Glass 4 | Glass 5 | Glass 6 |
|---|---|---|---|---|---|---|
| | Weight percent | | | | | |
| $SiO_2$ | 79.5 | 82.15 | 85.8 | 81 | 76 | 72 |
| $B_2O_3$ | 16.5 | 12.1 | 12.1 | 15 | 20 | 25 |
| $Al_2O_3$ | 1 | 2.4 | 0 | 1 | 1.3 | 1 |
| $Li_2O$ | 0 | 0 | 0 | 0 | 0 | 0.5 |
| $Na_2O$ | 3 | 2.95 | 2.1 | 3 | 2.6 | 0.5 |
| $K_2O$ | 0 | 0.4 | 0 | 0 | 0.1 | 1 |
| MgO | 0 | 0 | 0 | 0 | 0 | 0 |
| CaO | 0 | 0 | 0 | 0 | 0 | 0 |
| BaO | 0 | 0 | 0 | 0 | 0 | 0 |
| | Mole percent | | | | | |
| $SiO_2$ | 81.76 | 84.58 | 87.3 | 83.13 | 78.67 | 74.77 |
| $B_2O_3$ | 14.64 | 10.75 | 10.63 | 13.29 | 17.87 | 22.41 |
| $Al_2O_3$ | 0.61 | 1.46 | | 0.6 | 0.79 | 0.61 |
| $Li_2O$ | | | | | 0 | 1.04 |
| $Na_2O$ | 2.99 | 2.94 | 2.07 | 2.98 | 2.61 | 0.5 |
| $K_2O$ | | 0.26 | | | 0.07 | 0.66 |
| MgO | | | | | 0 | 0 |
| CaO | | | | | 0 | 0 |
| BaO | | | | | 0 | 0 |
| CTE at 210° C. according to Eq. (17) [ppm/K] | 3.51 | 3.44 | 3.073 | 3.47 | 3.486 | 3.31 |
| Melting temperature according to Eq. (22) [° C.] | 1535 | 1576 | 1572 | 1541 | 1547 | 1588 |
| Effective crosslinking index | 2.911 | 2.905 | 2.940 | 2.917 | 2.908 | 2.911 |

Glass 1 of the table is identical to Glass 1 of the exemplary embodiment presented further above.

Listed in the following table are comparative examples:

|  | Schott Boro 33 | Glass 7 | Glass 8 | Glass 9 | Glass 10 | Glass 11 | Glass 12 | Glass 13 | Glass 14 |
|---|---|---|---|---|---|---|---|---|---|
| | Weight percent | | | | | | | | |
| $SiO_2$ | 81 | 80.9 | 81.2 | 80.6 | 79.3 | 66 | 79 | 79.8 | 78.6 |
| $B_2O_3$ | 12.5 | 12.8 | 12.5 | 13.2 | 13.6 | 25 | 10 | 13.4 | 10.6 |
| $Al_2O_3$ | 2.5 | 2.2 | 2.2 | 2 | 2.5 | 5 | 4 | 2.2 | 4.3 |

-continued

|  | Schott Boro 33 | Glass 7 | Glass 8 | Glass 9 | Glass 10 | Glass 11 | Glass 12 | Glass 13 | Glass 14 |
|---|---|---|---|---|---|---|---|---|---|
| $Li_2O$ | 0 | 0 | 0 | 0 | 0 | 0.6 | 0 | 0 | 0 |
| $Na_2O$ | 3.5 | 4.1 | 4.1 | 4 | 3.9 | 3.2 | 5 | 4.3 | 4.7 |
| $K_2O$ | 0.5 | 0 | 0.05 | 0.2 | 0.7 | 0 | 1 | 0.1 | 0.8 |
| MgO | 0 | 0 | 0 | 0 | 0 | 0 | 0 | 0 | 0.2 |
| CaO | 0 | 0 | 0 | 0 | 0 | 0 | 1 | 0 | 1.3 |
| BaO | 0 | 0 | 0 | 0 | 0 | 0 | 0 | 0 | 0 |
| Mole percent | | | | | | | | | |
| $SiO_2$ | 83.53 | 83.21 | 83.50 | 82.94 | 81.97 | 69.46 | 81.83 | 82.19 | 81.40 |
| $B_2O_3$ | 11.12 | 11.36 | 11.09 | 11.72 | 12.13 | 22.71 | 8.94 | 11.91 | 9.47 |
| $Al_2O_3$ | 1.52 | 1.33 | 1.33 | 1.21 | 1.52 | 3.10 | 2.44 | 1.34 | 2.62 |
| $Li_2O$ | 0.00 | 0.00 | 0.00 | 0.00 | 0.00 | 1.27 | 0.00 | 0.00 | 0.00 |
| $Na_2O$ | 3.50 | 4.09 | 4.09 | 3.99 | 3.91 | 3.26 | 5.02 | 4.29 | 4.72 |
| $K_2O$ | 0.33 | 0.00 | 0.03 | 0.13 | 0.46 | 0.00 | 0.66 | 0.07 | 0.53 |
| MgO | 0.00 | 0.00 | 0.00 | 0.00 | 0.00 | 0.00 | 0.00 | 0.00 | 0.31 |
| CaO | 0.00 | 0.00 | 0.00 | 0.00 | 0.00 | 0.00 | 1.11 | 0.00 | 1.44 |
| BaO | 0.00 | 0.00 | 0.00 | 0.00 | 0.00 | 0.00 | 0.00 | 0.00 | 0.00 |
| CTE at 210° C. according to Eq. (6) [ppm/K] | 3.69 | 3.80 | 3.80 | 3.83 | 3.91 | 4.06 | 4.49 | 3.91 | 4.37 |
| Melting temperature according to Eq. (22) [° C.] | 1553 | 1542 | 1543 | 1532 | 1525 | 1597 | 1523 | 1527 | 1530 |
| Effective crosslinking index | 2.893 | 2.891 | 2.891 | 2.891 | 2.883 | 2.851 | 2.850 | 2.886 | 2.851 |

Mentioned as the first glass of these comparative examples is Borofloat 33, which has already been discussed above. A broad variability of the individual components is also found in the glasses of the comparative examples. However, in the case of the comparative examples, these interact in such a way that both the constraints per atom are fewer and the coefficient of expansion is larger than for glasses according to the invention.

The glasses according to the invention are also suitable, in particular, for hot forming in the float process. According to an enhancement of the invention, therefore, it is provided that the method comprises the forming of a sheet-shaped glass element from the glass melt, preferably by means of floating. In general, glasses according to the invention are preferably processed to sheet-shaped glass elements or to glass sheets for a diverse variety of applications. Especially in the case of sheet-shaped elements, the strength of the glass is of special importance in order to prevent cracking or bursting under mechanical loads. This also applies to fire-resistant glasses, for which no stresses that lead to fracture should arise due to large temperature differences in the event of fire.

The intrinsic strength of the glasses according to the invention is then so high and the brittleness so low that, in many cases, a tempering or chemical prestressing can also be dispensed with. According to an enhancement of the invention, the glass according to the invention is therefore further processed to a glass element that is not tempered or otherwise prestressed. Certain residual stresses due to production cannot be excluded in this case, but preferably the compressive stress on the surface is less than 10 MPa or the surface is free of compressive stress. Tempered glasses, by contrast, have typical compressive stresses of greater than 100 MPa.

Another preferred design consists of pipe-shaped glass elements for glass pipelines, for example. Here, too, the strength, in addition to the chemical resistance, plays an important role in order to ensure the safe passage of aggressive media. Furthermore, the glasses are also suitable for household appliances, such as cooking appliances. Further especially suitable uses are given in the above section as the object of the invention.

What is claimed is:

1. An alkali borosilicate glass with high strength, comprising the following components:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %, | as well as a total of 0-5.0 wt % of further components, wherein the proportions of the components are chosen in such a way that a weighted crosslinking index, that is, the mean number n of constraints per atom, given by $$n = \frac{N}{N_A} \bigg/ \bigg( c(SiO_2) \cdot 3 + c(Al_2O_3) \cdot 5 + c(B_2O_3) \cdot 5 + \sum_i c(M_2^i O) \cdot 3 + \sum_j c(M^j O) \cdot 2 \bigg)$$

has a value greater than 2.9,
wherein N is a total number of constraints per mole and NA is Avogadro's number and $c(SiO_2)$, $c(Al_2O_3)$, and $c(B_2O_3)$ refer to the molar concentrations of $SiO_2$, $Al_2O_3$, and $B_2O_3$, the $c(M^i{}_2O)$ values refer to the molar concentrations of the alkali oxides $M^i{}_2O$ present, and the $c(M^iO)$ values refer to the molar proportions of the alkaline earth oxides present, and wherein the ratio $N/N_A$ is given by $$\frac{N}{N_A} = c(SiO_2) \cdot 9 + c(Al_2O_3) \cdot 2 \cdot \left(4 + 5 \cdot \frac{K(Al-O)}{K(Si-O)}\right) \cdot \frac{e_d(Al-O)/4}{e_d(Si-O)/4} +$$

$$\left(\sum_i c(M_2^i O) + \sum_j c(M^j O) - c(Al_2O_3)\right) \cdot 2 \cdot \left(4 + 5 \cdot \frac{K(B-O)}{K(Si-O)}\right) \cdot$$

$$\frac{e_d(B-O)/4}{e_d(Si-O)/4} + \left(c(B_2O_3) + c(Al_2O_3) - \sum_i c(M_2^i O) - \sum_j c(M^j O)\right) \cdot$$

$$2 \cdot \left(3 + 3 \cdot \frac{K(B-O)}{K(Si-O)}\right) \cdot \frac{e_d(B-O)/3}{e_d(Si-O)/4} +$$

$$\sum_i c(M_2^i O) \cdot 2 \cdot \frac{e_d(M^i-O)}{e_d(Si-O)/4} + \sum_j c(M^j O) \cdot 2 \cdot \frac{e_d(M^j-O)/2}{e_d(Si-O)/4}$$

where the K(M-O), M=Si, Al, B are the degrees of covalence of the respective M-O bonds of the components $SiO_2$, $Al_2O_3$, $B_2O_3$, where:
a degree of covalence of 0.5527 for $SiO_2$,
a degree of covalence of 0.6126 for $B_2O_3$, and
a degree of covalence of 0.4329 for $Al_2O_3$, and wherein the $e_d$(M-O) values are the respective, cation-related dissociation energies of the components $SiO_2$, $Al_2O_3$, $B_2O_3$ and are given as: 1864 kJ/mol for $SiO_2$, 1572.5 kJ/mol for $B_2O_3$, and 1537 kJ/mol for $Al_2O_3$.

2. The alkali borosilicate glass according to claim 1, wherein the mean number n of constraints per atom has a value greater than 2.91.

3. The alkali borosilicate glass according to claim 1, wherein the mean number n of constraints per atom has a value greater than 2.92.

4. The alkali borosilicate glass according to claim 1, wherein the mean number n of constraints per atom has a value greater than 2.93.

5. The alkali borosilicate glass according to claim 1, wherein the glass has a coefficient of linear thermal expansion of less than 3.6 ppm/K at a temperature of 210° C.

6. The alkali borosilicate glass according to claim 5, wherein the components of the glass are chosen in such a way that the value of the coefficient of linear thermal expansion at a temperature of 210° C. determined according to the equation $$\alpha(210°\,C.) = \beta_0 + \sum_{j=1}^{n}\left(\beta_j \cdot C_j + \beta_{j2} \cdot C_j^2 + \sum_{k=j+1}^{n} \beta_{jk} \cdot C_j \cdot C_k\right)$$

is less than $3.6 \cdot 10^{-6}$ K$^{-1}$, wherein $C_j$, $C_k$ are the molar concentrations (in mole percent) of the respective components of the glass composition, and wherein the following is valid for the coefficients $\beta_0$, $\beta_j$, $\beta_{j2}$, $\beta_{jk}$:

| Coefficient | Value |
|---|---|
| Axial intercept ($\beta_0$) | 1.7672 |
| Na$_2$O ($\beta_j$) | 0.4545 |
| Na$_2$O ($\beta_{j2}$) | −0.001198 |
| CaO ($\beta_j$) | 0.1682 |
| Al$_2$O$_3$ ($\beta_j$) | −0.0641 |
| Al$_2$O$_3$ ($\beta_{j2}$) | 0.006473 |

-continued

| Coefficient | Value |
|---|---|
| K$_2$O ($\beta_j$) | 0.5320 |
| K$_2$O ($\beta_{j2}$) | −0.001710 |
| MgO ($\beta_j$) | 0.0499 |
| B$_2$O$_3$ ($\beta_j$) | 0.0465 |
| Li$_2$O ($\beta_j$) | 0.1896 |
| Li$_2$O ($\beta_{j2}$) | 0.003242 |
| SrO ($\beta_j$) | 0.1717 |
| BaO ($\beta_j$) | 0.3077 |
| ZrO$_2$ ($\beta_j$) | −0.0591 |
| TiO$_2$ ($\beta_j$) | −0.0138 |
| ZnO ($\beta_j$) | 0.0102 |
| PbO ($\beta_j$) | 0.1345 |
| F ($\beta_j$) | 0.1305 |
| Na$_2$O*CaO ($\beta_{jk}$) | −0.002579 |
| Na$_2$O*B$_2$O$_3$ ($\beta_{jk}$) | −0.005640 |
| Na$_2$O*Li$_2$O ($\beta_{jk}$) | 0.018869 |
| CaO*MgO ($\beta_{jk}$) | 0.002627 |
| CaO*B$_2$O$_3$ ($\beta_{jk}$) | −0.002682 |
| CaO*BaO ($\beta_{jk}$) | −0.011958 |
| K$_2$O*B$_2$O$_3$ ($\beta_{jk}$) | −0.012682. |

7. The alkali borosilicate glass according to claim 1, wherein the glass composition comprises a composition range selected from the group consisting of:

| | Range 1 | Range 2 | Range 3 | Range 4 | Range 5 | Range 6 |
|---|---|---|---|---|---|---|
| | | | Weight percent | | | |
| SiO$_2$ | 79-80 | 81.5-83.5 | 85-86 | 80-82 | 75-77 | 71.2-73.2 |
| B$_2$O$_3$ | 16-17 | 11.5-13 | 11.5-13 | 14-16 | 19-21 | 23.8-25 |
| Al$_2$O$_3$ | 0.5-1.5 | 2-3 | 0 | 0.5-1.5 | 0.8-2 | 0.5-1.5 |
| Li$_2$O | 0 | 0 | 0 | 0 | 0 | 0.25-0.75 |
| Na$_2$O | 2-4 | 2-4 | 1-3 | 2-4 | 2-3 | 0.5-0.75 |
| K$_2$O | 0 | 0.1-1 | 0 | 0 | 0.05-0.2 | 0.5-1.0 |
| MgO | 0 | 0 | 0 | 0 | 0 | 0 |
| CaO | 0 | 0 | 0 | 0 | 0 | 0 |
| BaO | 0 | 0 | 0 | 0 | 0 | 0. |

8. The alkali borosilicate glass according to claim 1, further comprising a sum of the contents of SiO$_2$ and B$_2$O$_3$ that lies in the range of 95.5 wt % to 97.5 wt %.

9. The alkali borosilicate glass according to claim 1, further comprising a sum of the contents of SiO$_2$ and B$_2$O$_3$ that lies in the range of 95.8 wt % to 97.2 wt %.

10. The alkali borosilicate glass according to claim 1, further comprising a sum of the contents of SiO$_2$ and B$_2$O$_3$ that lies in the range of 95.8 wt % to 97.1 wt %.

11. The alkali borosilicate glass according to claim 1, further comprising a sum of the contents of SiO$_2$ and B$_2$O$_3$ that lie in the range of 95.5 mol % to 97.5 mol %.

12. The alkali borosilicate glass according to claim 1, further comprising a sum of the contents of SiO$_2$ and B$_2$O$_3$ that lie in the range of 95.7 mol % to 97.2 mol %.

13. The alkali borosilicate glass according to claim 1, further comprising a sum of the contents of SiO$_2$ and B$_2$O$_3$ that lie in the range of 95.7 mol % to 97.1 mol %.

14. The alkali borosilicate glass according to claim 1, wherein the glass comprises a glass element in the form of a sheet or pipe.

15. The glass element according to claim 1, further comprising a compressive stress at a surface of less than 10 MPa.

* * * * *